United States Patent [19]
Ivansons et al.

[11] Patent Number: 5,279,685
[45] Date of Patent: Jan. 18, 1994

[54] TOTAL CONTAINMENT DEVICE FOR CONNECT/DISCONNECT OF PLASTIC TUBES

[75] Inventors: Ivars V. Ivansons, Newark; Valdis Ivansons; Dudley W. C. Spencer, both of Wilmington, all of Del.

[73] Assignee: Denco, Inc., Wilmington, Del.

[21] Appl. No.: 965,875

[22] Filed: Oct. 23, 1992

Related U.S. Application Data

[63] Continuation-in-part of Ser. No. 764,249, Sep. 23, 1991, Pat. No. 5,209,800, which is a continuation-in-part of Ser. No. 682,977, Apr. 10, 1991, Pat. No. 5,156,701, which is a continuation-in-part of Ser. No. 604,976, Oct. 29, 1990, abandoned, which is a continuation-in-part of Ser. No. 569,855, Aug. 20, 1990, Pat. No. 5,141,592.

[51] Int. Cl.$^5$ .................................. B32B 31/02
[52] U.S. Cl. ............... 156/158; 156/304.2; 156/304.6; 156/350; 156/499; 156/503; 156/507; 156/515
[58] Field of Search .............. 156/158, 304.2, 304.6, 156/499, 503, 507, 251, 350, 515; 604/905

[56] References Cited

U.S. PATENT DOCUMENTS

| | | | |
|---|---|---|---|
| 4,737,214 | 4/1988 | Leurink et al. | 156/158 |
| 4,753,697 | 6/1988 | Shaposki et al. | 156/158 |
| 4,793,888 | 12/1988 | Shaposki et al. | 156/158 |
| 4,897,138 | 1/1990 | Shaposki et al. | 156/158 |
| 5,156,701 | 10/1992 | Spencer et al. | 156/158 |

*Primary Examiner*—Caleb Weston
*Attorney, Agent, or Firm*—Connolly & Hutz

[57] ABSTRACT

A device for selectively connecting and disconnecting plastic tubes includes a welder. A carriage is located in the welder for conveying a heated wafer through the welder. A pair of arms is mounted in the welder with each arm having a tube holding pocket which extends across its respective arm. The arms are movably mounted to generally align the pockets with a gap therebetween. Each of the arms has a clamp for selectively clamping a tube in its pocket. A wafer removal station is in the welder downstream from the arms. The carriage is driven to the wafer removal station so that the wafer first passes through the gap to contact the tubes and then the wafer passes into the removal station so that it may be removed from the carriage and the carriage may be returned to its starting location. The welder includes a computer for controlling the operation and synchronizing the timing of the carriage and the arms to automate the welder.

16 Claims, 12 Drawing Sheets

TOTAL CONTAINMENT DEVICE FOR CONNECT/DISCONNECT OF PLASTIC TUBES

CROSS-REFERENCE TO RELATED APPLICATIONS

This application is a continuation-in-part of application Ser. No. 764,249 filed Sept. 23, 1991, U.S. Pat. No. 5,209,800, which in turn is a continuation-in-part of application Ser. No. 682,977 filed Apr. 10, 1991, now U.S. Pat. No. 5,156,701, which in turn is a continuation-in-part of Ser. No. 604,976 filed Oct. 29, 1990, now abandoned, which in turn is a continuation-in-part of application Ser. No. 569,855 filed Aug. 20, 1990, now U.S. Pat. No. 5,141,592.

BACKGROUND OF THE INVENTION

The above noted parent applications, deal with various techniques for the total technique welding of plastic tubes where no contaminants can enter or leave the tube lumen. In general, the welding techniques involve an axially aligned melt/wipe process where the ends of the tube sections are melted to be rendered into a molten state and then pressed together to become integral.

The above techniques are particularly desirable for wide spread uses including CAPD, blood processing and other techniques where it is necessary to replace used consumables. In such practices it is necessary to cut the tube leading from the used bag to the patient and then weld a new tube section from a fresh bag to the tube section leading from the patient. It would be desirable if the tube cutting or disconnect procedure or the tube joining or connect procedure could be made as simple as possible in order to avoid difficulties in performing these procedures.

The prior art devices for connecting and disconnecting plastic tubes requires the manual actuation of various switches to individually control the operation of the different components. It would be desirable if such a device could be automated in its operation.

It would also be desirable if such a device for performing the above procedures could include various safety mechanisms to assure proper operation of the device.

SUMMARY OF THE INVENTION

An object of this invention is to provide sterile tube connect/disconnect techniques which meet the above needs.

A further object of this invention is to provide a device for accomplishing such techniques wherein there is assurance that the device will operate in a proper manner.

In accordance with this invention a single device is used for selectively connecting and disconnecting plastic tubes. The device includes a welder having a carriage for transporting a heated wafer. A pair of arms is provided in the welder each with a tube holding pocket which extends across its respective arm. The arms are pivotally mounted so that the pockets can be generally aligned. Each of the arms includes a clamp for selectively clamping a tube section in its pocket. A wafer removal station is located in the welder downstream from the arms. The carriage is driven to the wafer removal station with the wafer passing through the gap between the tubes and melting the tubes by the tubes being pressed toward the wafer so that the melted ends of the tubes may be welded together after the wafer is transported to the removal station during a connect operation.

During the disconnect operation the same device is used wherein a single tube is located in both pockets spanning the gap between the pockets and the heated wafer cuts through the tube to perform the disconnect operation.

A computer controls the operation and synchronizes the timing of the carriage and of the arms to automate the device.

In a preferred practice of this invention the removal station includes clench blocks for cooling the wafer. Negative ion generator means are provided to dissolve any aerosol resulting from the heated tubes. The clamps may include serrated clamp blocks which could be used for reopening a welded tube in the connect mold by first rotating the welded tube about 900 so that its flat side is moved from a horizontal to a vertical position by pressing the serrated clamp blocks against the welded connection of the two tubes. The connection that the tubes are moved to a generally circular cross-section thereby opening communications between the two welded tube sections.

DETAILED DESCRIPTION

Figure 3:
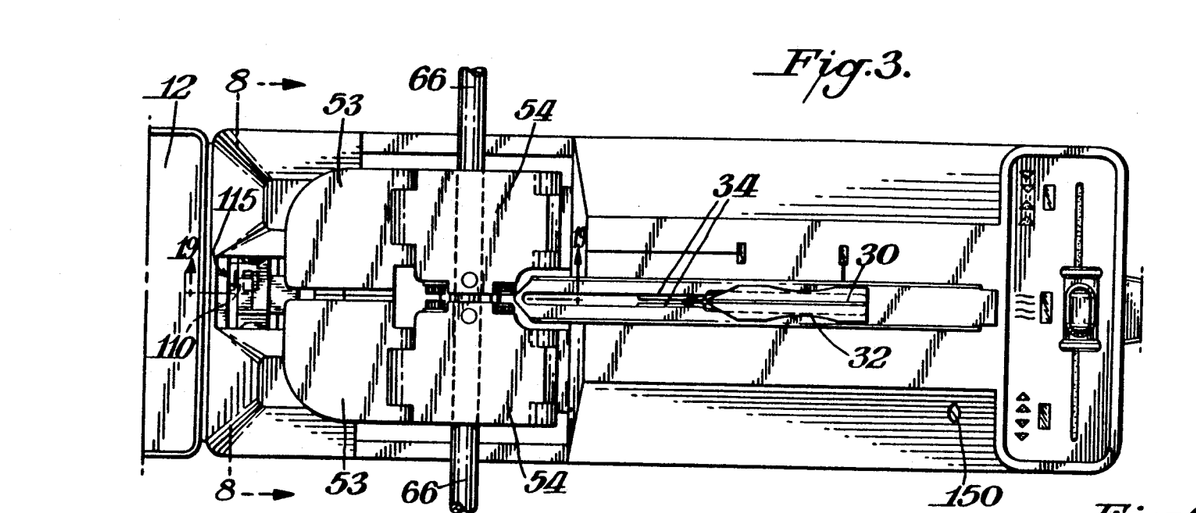
FIG. 3 is a top plan view of the device shown in FIGS. 1-2 with the cover of the device in its open position.
Figure 4:
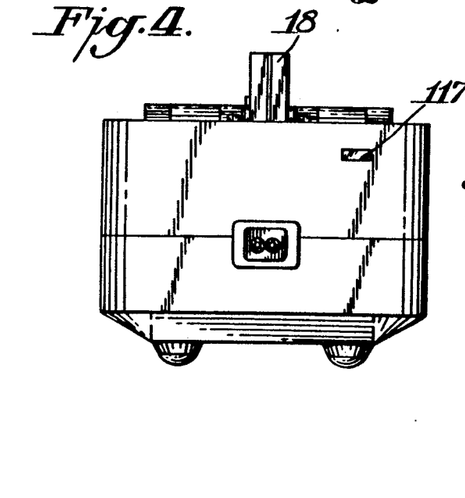
FIG. 4 is a right end elevational view of the device shown in FIG. 3.
Figure 5:
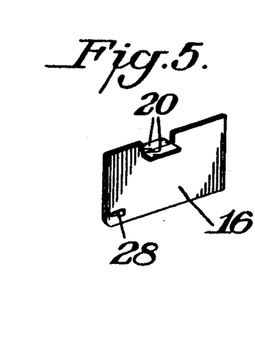
FIG. 5 is a perspective view of a wafer used in the device of FIGS. 1-4.

The present invention is directed to the various techniques disclosed in the parent applications and more particularly to a device capable of effectively performing the tube connect or the tube disconnect operations such as generally described in the parent applications. The details of the parent applications are incorporated herein by reference thereto. As illustrated herein the device for selectively connecting and disconnecting plastic tubes comprises a welder 10 which generally includes a chassis or body member with a hinged lid or cover 12. The casing for welder 10 may be a lower shell 11 detachably secured to an upper shell 13 by suitable fasteners. Lid 12 is hinged at one end to upper shell 13. Cover 12 may be reliably held in its closed position in any suitable manner, such as by a magnetic closure 14 which is magnetically attracted to a portion of the welder body. When it is desired to use welder 10 cover 12 would be pivoted to the open position shown in FIG. 3.

Figure 6:
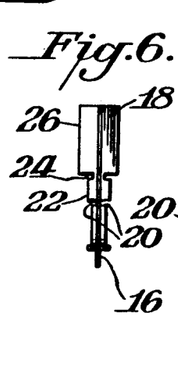
FIG. 6 is an end elevational view of the wafer of FIG. 5 mounted in a carrier.
Figure 7:
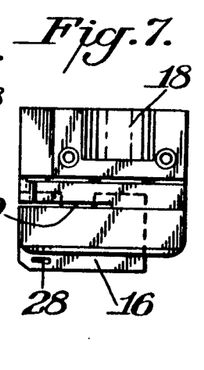
FIG. 7 is a side elevational view of the wafer and carrier shown in FIG. 6.

In general, welder 10 operates by using a heated disposable wafer 16 which performs a melt/wipe operation during the connect procedure and which forms a cutting operation during the disconnect procedure. Wafer 16 would be mounted in a suitable holder 18. As shown in FIGS. 6-7, holder 18 has a slot into which wafer 16 is detachably mounted with the wings 20 of wafer 16 abutting against lower block portion 22 of holder 18. A pair of notches 24 is formed between lower block portion 22 and upper block portion 26 of holder 18. Wafer 16 also includes a notch or cut out for purposes later described.

Welder 10 has a slot 30 exposed from its top surface with the upstream end 32 of the slot 30 being of a sufficient width to permit wafer 16 and its holder 18 to be inserted into the slot. The upstream wide end 32 of slot 30 may be considered the home position. Slot 30 engages notches 24 and forms a track for carrier 18. A pair of tapered spring arms 34 are provided in the bottom of slot 30. Arms 34 are dimensioned to fit against the wafer 16 when holder 18 is at the end of slot 30. Arms 34 are connected to a heater to heat wafer 16.

A carriage 36 is located along the track formed by slot 30 remote from home position 32. Carriage 36 includes a spring mounted pawl 38 (FIG. 9) which engages cut out 28 of wafer 16 to lock wafer 16 to carriage 36 and permit holder 18 to be -moved back toward the home position 32 while wafer 16 remains locked to carriage 36 thus disengaging wafer 16 from holder 18. Carrier 18 may then be removed from welder 10 when it returns to the home position 32. A spring arm 40 (FIG. 13) is located at the starting position of carriage 36 to lock carriage 36 in that position until carriage 36 is driven in a downstream direction as later described.

Suitable heater elements connected to ar-Ms 34 heat wafer 16 when wafer 16 is mounted to carriage 36 while carriage 36 is in its starting position.

Figure 9:
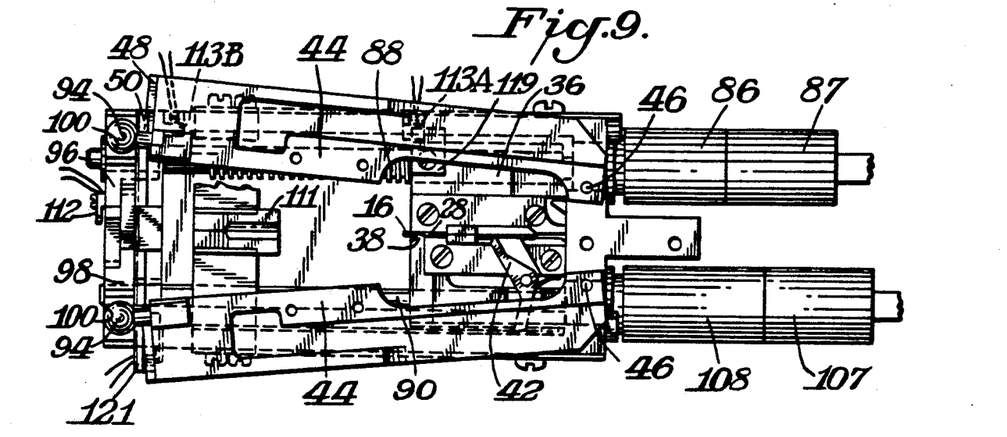
FIG. 9 is a top plan view with the clamp mechanisms omitted to show the holder arms of the device of FIGS. 1-4 in one phase of operation.

As shown in FIG. 9 a spring arm 42 is mounted at the starting position of carriage 36 and is urged into contact with wafer 16 while carriage 36 is in the starting position. Arm 42 functions as a sensor during later operation of welder 10 to detect the passage of wafer 16 in a downstream direction.

Welder 10 also includes a pair of pivotable arms 44,44 pivoting around pivot pins 46,46 so that the arms 44,44 may move in a horizontal plane.

Figures 19, 20:
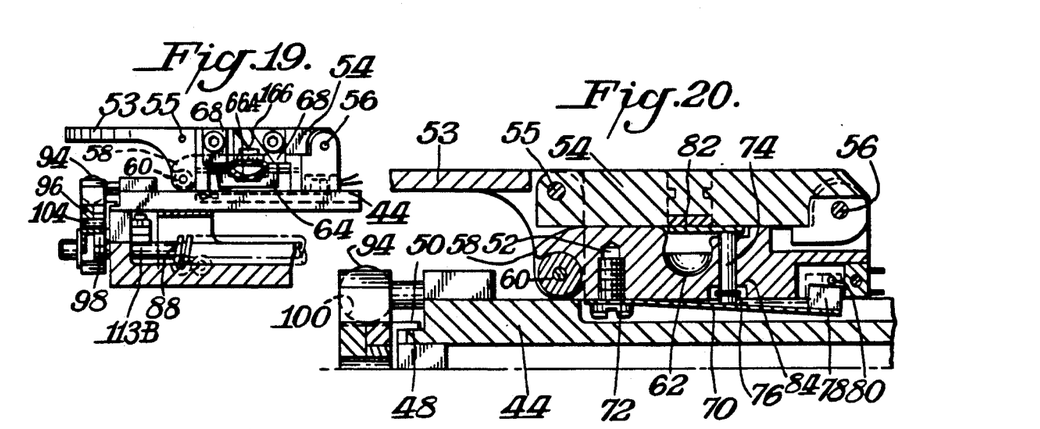
FIG. 19 is a elevational view partly in section of the device shown in FIGS. 17-18.
FIG. 20 is a cross-sectional view in elevation of a portion of the device shown in FIGS. 17-18.

As shown for example in FIG. 20 clamp holder arms 44 include an off-set extension 48 which is disposed for sliding under bracket 50. Bracket 50 thus assures that the pivoted clamp holder arms 44 are maintained in their proper horizontal orientation. As also shown in FIG. 20 a clamp mechanism is secured to each holder arm 44. The clamp mechanism comprises a base clamp 52 and a lid 54. Base clamp 52 is fixedly mounted to its respective arm 44 while lid 54 is pivoted about pin 56 to base clamp 52 so that the lid can be moved to its open and closed position. Lid 54 includes a handle portion 53 pivoted about pin 55 to the main portion of lid 54. Handle portion 53 is generally L-shaped with an extension 57 having a roller 60 which extends longitudinally across extension 57. Base clamp 52 includes a lock lip 58. Lid 54 is moved to its closed position by grasping handle 53 and rotating lid 54 toward base clamp 52. Continued movement of handle 53 causes roller 60 to be disposed under lock lip 58 to effectively lock the clamp lid 54 against base clamp 52.

As illustrated in various figures such as FIG. 20, a pocket 62 is formed in base clamp 52. Pocket 62 extends completely across base clamp 52 as illustrated for example in FIGS. 10 and 18. It is noted that FIG. 9 shows the arms 44 with the clamping mechanisms removed so that the details of arms 44 would be more clearly illustrated.

Figure 10:
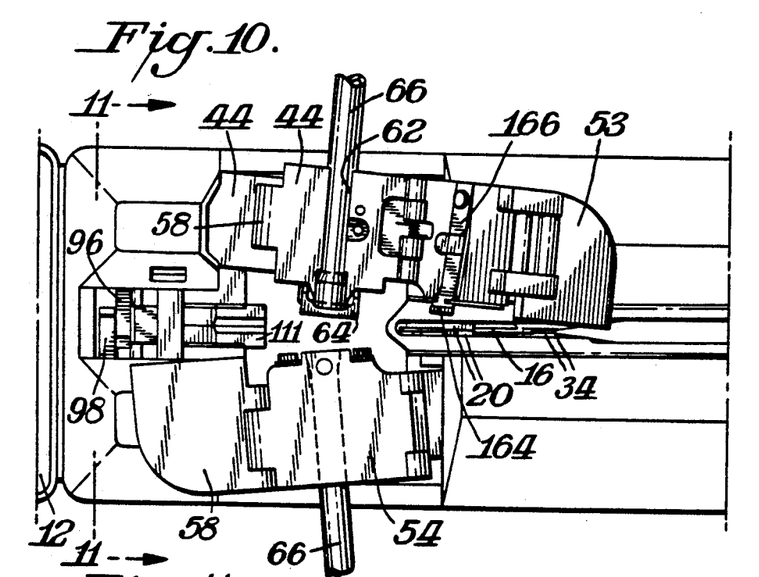
FIG. 10 is a top plan view similar to FIG. 9 with the clamp mechanisms illustrated.

As shown, for example, in FIG. 10 a locating wall 64 is movably mounted at the end of each pocket 62 to close the pocket. Locating wall 64 is of generally U-shape so that its bight or main wall portion is disposed beyond the end of its respective pocket 62. When a tube 66 is inserted into a pocket 64 the tube 66 would be moved inwardly into its respective pocket until the end of the tube abuts against locating wall 64. This assures proper positioning of the tube for a later connect operation. Each lid 54 would include a pair of wall inactivating members 68 disposed for moving the upwardly spring biased locating wall 64 in a downward direction to move wall 64 clear of pocket 62 when clamp lid 54 is in its closed position.

Figure 18:
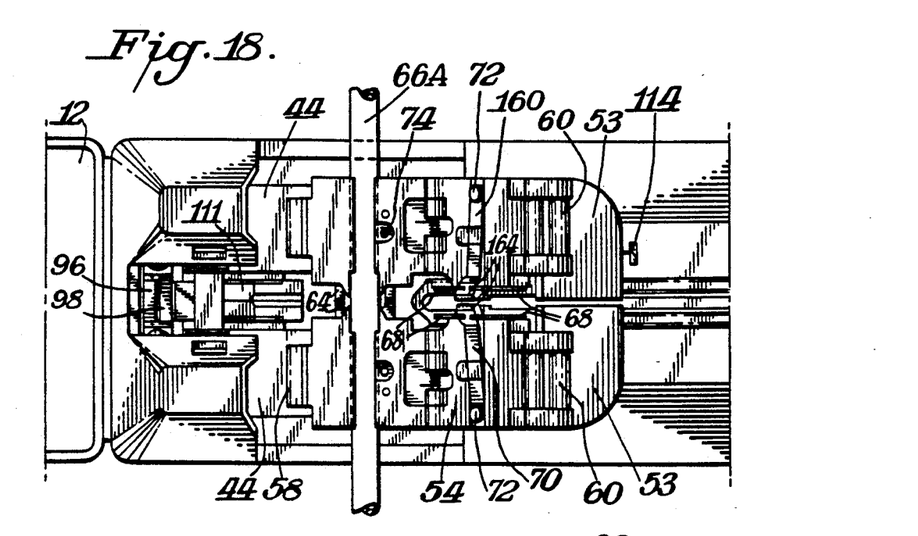
FIG. 18 is a top plan view of the device shown in FIG. 17.

A further feature of the clamp mechanism is the provision of sensing means to assure the presence of a squashed tube and to assure the clamp being in its closed position. The details thereof are best illustrated in FIGS. 17-20. As shown in FIGS. 18 and 20 a spring arm 70 is secured by a suitable fastener 72 to base clamp 52. A pin 74 is movably mounted in a suitable passageway in base clamp 52 and rests on spring arm 70. Pin 74 includes an annular flange 76 which would engage the shoulder 84 in base clamping arm 52 to limit the upward movement of pin 74. The end of remote from fastener 72 carries a sensor flag 78 which is disposed for movement into and out of a beam from the sensor 80. When clamp lid 54 is in its opened position (FIGS. 17-18) spring arm 70 urges flag 70 upwardly to interrupt the beam thereby indicating that the clamp mechanism is open. Clamp lid 54 carries a tube contact tab 82. When the clamp mechanism is in its closed position the tube contact pad 82 would be pressed against tube 66 and would also press against pin 74 to move pin 74 downwardly with its flange 76 moved away from the shoulder 84 in base clamp 52. The downward movement would also cause spring arm 70 to be pivoted about fastener 72 and move flag 78 out of the beam from sensor 80, thus indicating that the clamp is closed and the tube is in its proper squashed condition. It is noted that for the sake of clarity the tube is not illustrated in FIG. 20 but is illustrated in FIG. 19.

After the clamp mechanisms have been loaded with tubes 6, carriage 36 is moved in a downstream direction when the wafer 16 has been heated to a predetermined temperature.

Figure 2:
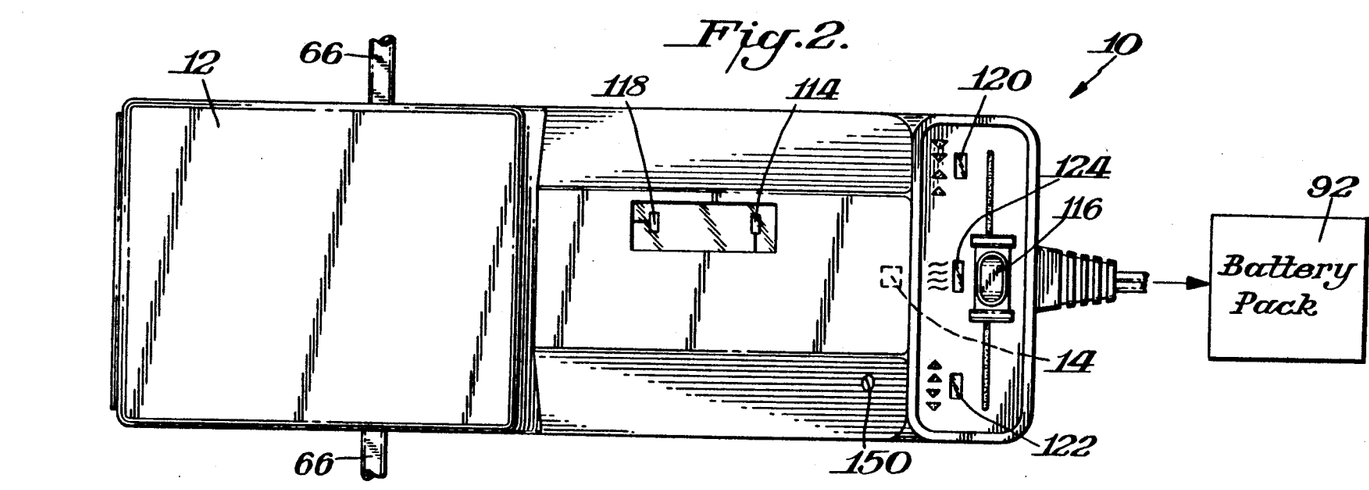
FIG. 2 is a top plan view of the device shown in FIG. 1.

FIG. 9 illustrates the reversible motor 86 for driving carriage 36. As later described motor 86 includes a magnetic encoder 87. Motor 86 rotates an elongated drive screw 88 to move the carriage away from its starting position and back to its starting position. A guide rod 90 is located parallel to drive screw 88 to assure proper alignment of the carriage 36 during its movement. Carriage motor 86 may be operated by any suitable source such as a battery pack 92 (FIG. 2). The various mechanisms for turning on the heater for wafer 16, for driving motor 86 and for rotating arms 44 as well as the timing of the various operations may be controlled by a suitable controller or computer 146 as shown in FIG. 29.

Figure 8:
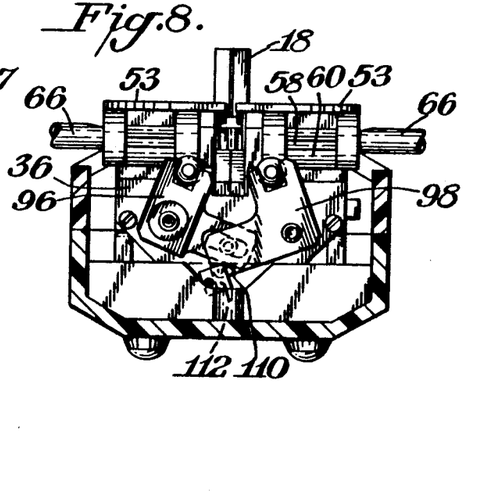
FIG. 8 is a cross-sectional view taken through FIG. 3 along the line 8—8.
Figure 11:
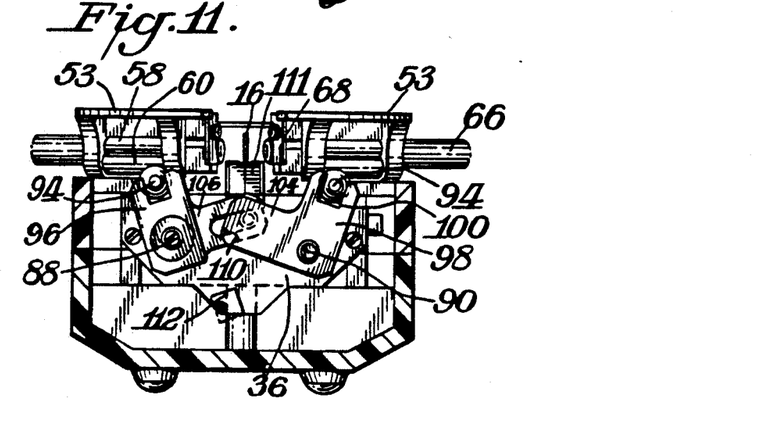
FIG. 11 is a cross-sectional view taken through FIG. 10 along the line 11—11.

Controlled joint pivotable movement of arms 44 is accomplished by a rocker mechanism best illustrated in FIGS. 8 and 11. Each holder arm 44 has a rotatable ball or sphere 94 connected thereto. A pair of rocker arms 96 and 98 is provided with each rocker arm having a socket 100 formed in its corresponding yoke. Rocker arm 96 is pivotally mounted about the smooth end of screw 88. Rocker arm 98 pivots about guide rod 90. Rocker arm 98 is the driver arm and includes a pin 104 which extends through slot 106 of rocker arm 96. Rocker arm 96 in turn is the driven rocker arm.

A motor 108 controls the rotational movement of guide rod 90 which is associated with driver rocker arm 98. A magnetic encoder 107 is provided for motor 108. When the rocker arm is pivoted by guide pin 90, socket 100 of rocker arm 98 rotates its ball 94 to rotate its arm 44 in a horizontal direction. Pin 104 mounted in slot 106 in turn causes driven rocker arm 96 to rotate which in turn causes the other clamp support arm 44 to move horizontally in response to the seating of its ball 94 in socket 100 of arm 96.

Another feature of the rocker arms is that the rocker arms may be used to detect that the clamp arms 44 have been moved sufficiently close to each other so that the tube sections are in contact with the wafer. This feature is best shown in FIG. 8 where the corner 110 of rocker arm 98 is disposed as interrupting a beam of light from a sensor 112 when the clamp holder arms are moved to have the tube sections in their wafer abutting condition.

Downstream from the clamp mechanism is a wafer removal station 114 which includes a pair of copper quench blocks 111 dimensioned to permit the wafer 16 to be disposed between the blocks 111 when carriage 36 is moved to its end position. Blocks 111 are spring biased toward each other by being mounted to spring arms 109 to assure contacting wafer 16 to cool the wafer. After the wafer 16 has been sufficiently cooled it can be pulled upwardly from between blocks 116 disconnecting the pawl 38 from notch or cut-out 24. The used wafer can then be discarded. Carriage 36 would then be moved by drive screw 88 back to its starting position.

Figure 24:
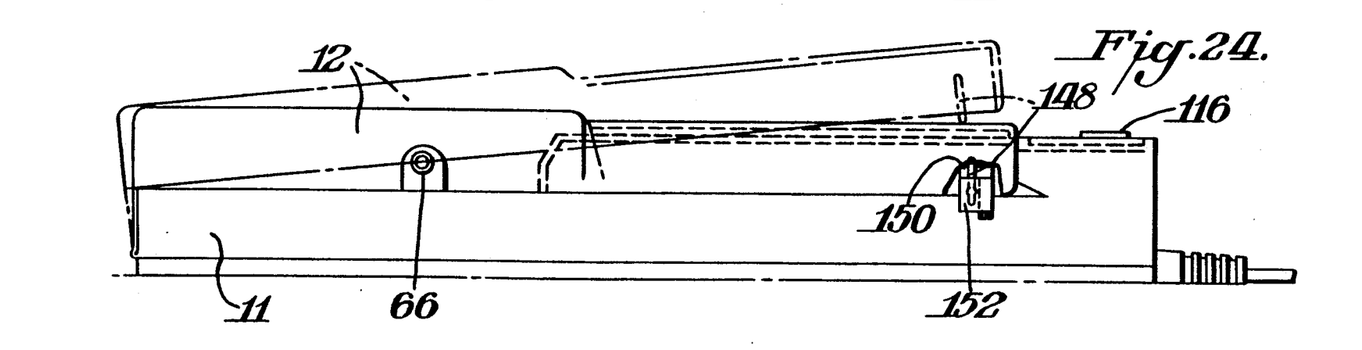
FIG. 24 is a side elevational view of the device shown in FIGS. 1-4 with the cover partially opened.

One of the features of welder 10 is the inclusion of various sensors to assure that welder 10 is operating in its intended manner. FIGS. 1-2 and 23-24 illustrate a sensing arrangement for assuring that the lid or cover 12 is in its closed position. As best shown in FIG. 24 lid 12 includes a downwardly projecting pin 148. The upper shell 13 has an opening 150 into which pin 148 would enter when lid 12 is closed onto the upper shelf portion 13 of the casing. A photosensor 152 is mounted in opening 150. When pin 148 enters the opening 150 in the condition of lid 12 being fully closed, the beam of light from the optical sensor 152 is interrupted to detect the proper closure of cover or lid 12.

Figure 12:
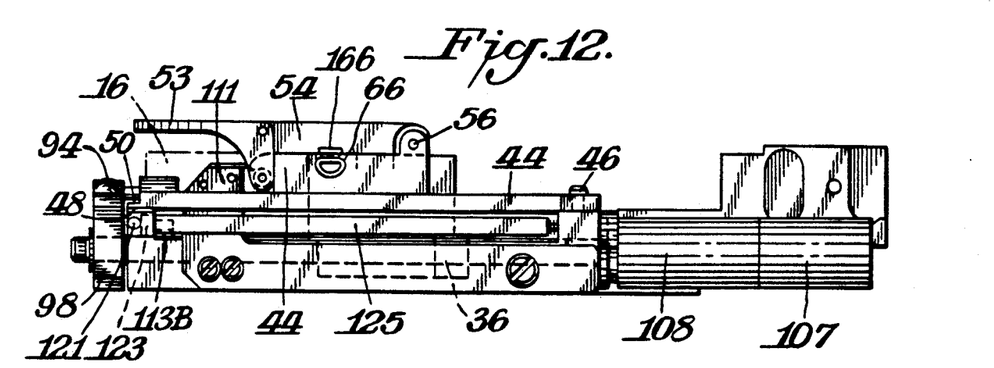
FIG. 12 is a side elevational view of the device shown in FIGS. 1-4 in its connect position.
Figure 13:
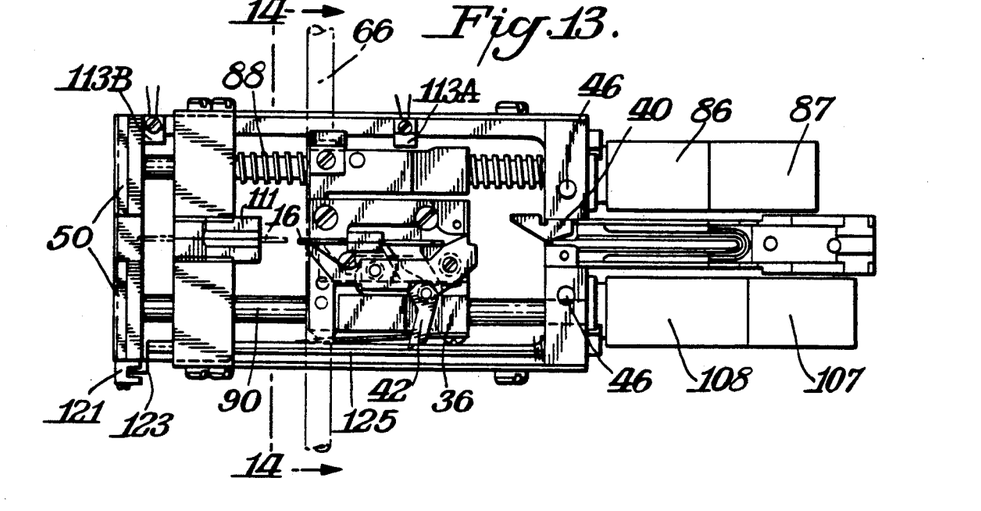
FIG. 13 is a top plan view of the device shown in FIG. 12.
Figure 14:
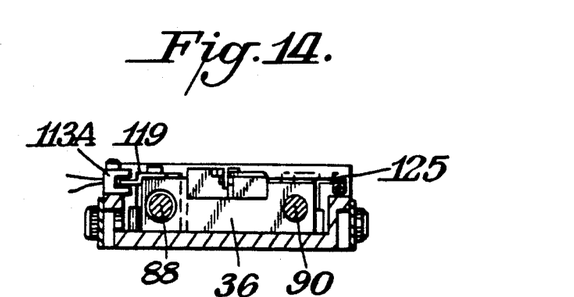
FIG. 14 is a cross-sectional view taken through FIG. 13 along the line 14—14.

As shown in FIGS. 12-14 carriage 36 has an outwardly extending arm 119 which acts as a detector for various sensors to determine different conditions of welder 10. For example, sensor 13A (FIG. 14) is provided to indicate that the wafer 16 is properly loaded in carriage 36. Sensor 113B (FIG. 13) detects the wafer being properly conditioned between clenching block 127.

Additional sensing is accomplished by means of spring arm 125 fixed to the chassis as shown in FIGS. 12-14. A flag 123 is mounted to the ends of spring arm 125. When flag 123 interrupts the beam from optical sensor 121 this is a signal that there is no wafer in the carriage 136.

The various sensors thus detect when the wafer is in the quench blocks, when the wafer is properly loaded and when there is no wafer in the carriage. Additionally, sensors detect when the carriage is in its home or starting position and when the carriage is in its forward most position at quenching station ill.

An important feature of the invention is the provision of means to dissipate the aerosol that would result from the melted plastic tubes. This is done by the provision of negative ion generators 154 mounted to the inner surface of upper shell 13. Four such negative ion generators are illustrated. The negative ion generators 154 are interconnected by solid copper wires 156 and are connected by wire 158 to a pair of diodes and capacitors 160 associated with transformer 162. The negative ion generators dissolve the aerosol or gases that would form from the melted tubing, such as PVC material. The dissolved gases would be attracted to the copper wafer 16. By having a closed cover 12 dissipation of the aerosol is assured to maintain any smoke in the closed cavity so that the aerosol would be directed to the wafer 16.

The provision of cover 12 not only functions in assuring proper operation of the negative ion generators and in adding to the aesthetic appearance of welder 10, but also covers the various components of cover 10 that should not be touched by the patient during operation of welder 10. Thus cover 12 adds to the safety in the operation of welder 10.

Figure 25:
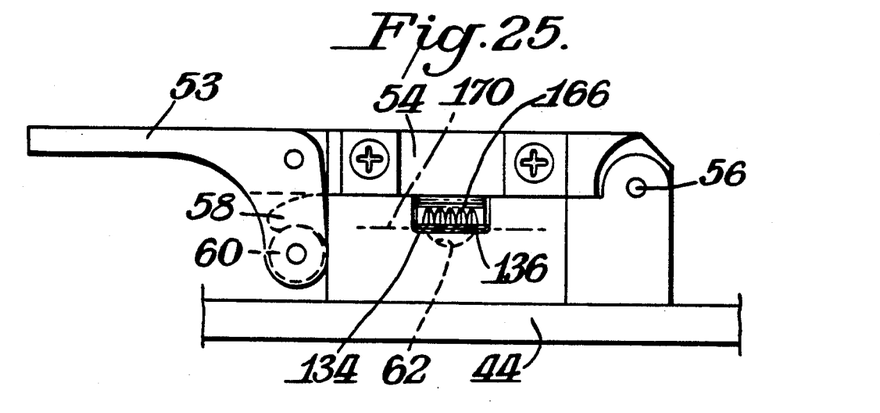
FIG. 25 is a side elevational view of a portion of the device shown in FIGS. 1-4 showing a clamping pad disposed against a flattened welded tube in the connect mode.
Figure 26:
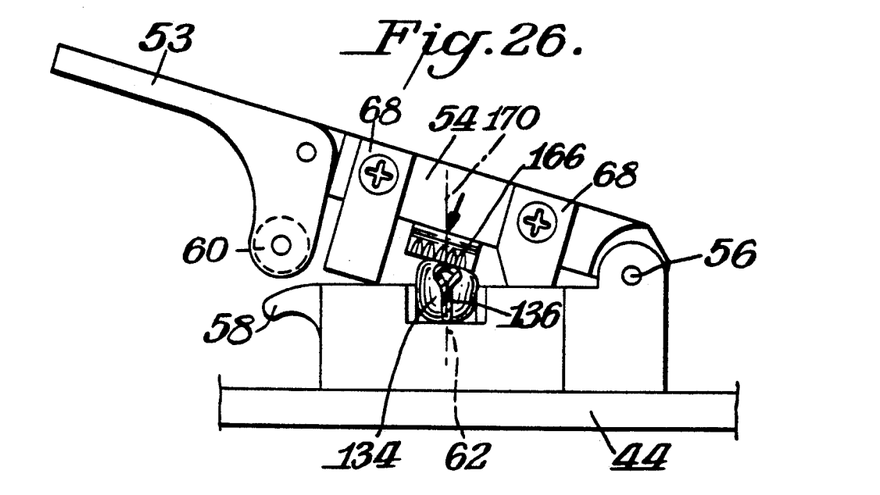
FIG. 26 is a view similar to FIG. 21 showing the clamping pads used for opening a flattened tube.
Figure 27:
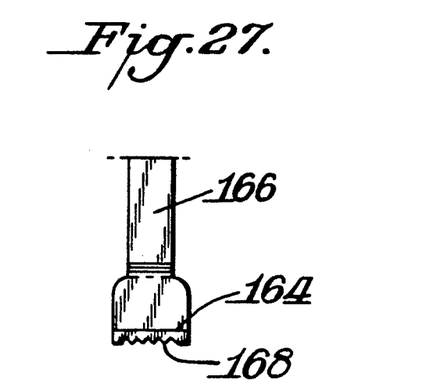
FIG. 27 is a front elevational view of the clamping pads shown in FIGS. 25-26.

A further distinctive feature of welder 10 is the inclusion of clamp pads 164 each of which is an offset extensions of arm 166 attached to the bottom of each clamp lid 54. As best shown in FIGS. 25-27 and as also shown in FIGS. 10 and 17-19 each clamp pad 164 terminates in a serrated edge 168. The clamp pads 164 press against the tubes to flatten the tubes in a horizontal plane. When welder 10 is used for the connect procedure the tubes 66 are flattened to a closed condition to form a connected tube 134 having its weld seam 136 in the plane indicated by the broken lines 170. It is then necessary to open the tube at weld seam 136. This can be done by opening upper clamp 54 and rotating the flattened tube 134 about 90° so that the flattened tubes in plane 170 are now in a vertical rather than a horizontal orientation. The upper clamp 54 is again moved in the closing direction as shown in FIG. 26 and the clamp pads 164 press against the flat tube 134 to begin to pop the tubes open. The provision of the serrated edge 168 helps prevent the tube 134 from slipping back toward its horizontal orientation during its opening action. The opening of the tube joined in the connect procedure can be accomplished with the use of only one clamp pad although two clamp pads may be used if desired.

The following is the sequence of operation during the tube connect procedure. The cycle would begin at the home or rest position where no tubes are in the welder 10 and no wafer is in the welder and wherein the clamp mechanisms are both open with the heaters off.

Figure 1:
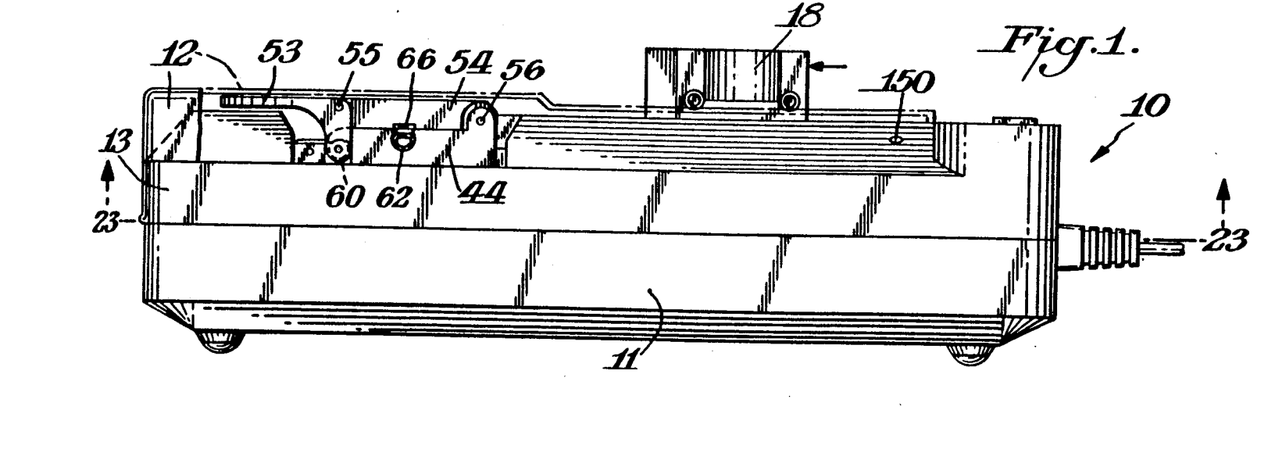
FIG. 1 is a side elevational view of a total containment connect/disconnect device for plastic tubes.

A new wafer 16 would then be inserted into its holder 18 and the unit would be mounted into the slot 30 at the top of welder 10. The carrier would then be advanced all the way forward where the wafer 16 would become engaged with carriage 36. The holder 18 would then be moved all the way back and removed from welder 10. This movement strips the wafer out of the wafer holder and loads it onto the carriage 36. If the user does not go far enough the wafer would not be installed and a sensor would detect this condition as indicated by LED 115 (FIG. 1). If the user tries to feed another wafer without welding with the first wafer the carriage lock mechanism will prevent another wafer feed. Also if the carriage is not all the way back to its start position the wafer feed will be prevented.

In a typical use a consumable would have a tube 66 attached to it. The user would first insert the tube into the pocket 62 in a base clamp 52. The tube 66 would be installed so that its end is pushed against locating wall 64. When the clamp lid 64 is closed and locked the locating wall 64 is caused to swing out of the way. The user then installs the free sealed end of the other tube 66 coming, for example, from his peritoneum into the other clamp mechanism in such a manner that the sealed end of the tube butts against the other locating wall 64 and that wall is also moved out of the way when the clamped lid is closed. The start button 116 (FIG. 1) would then be pressed. The control unit will read this signal and begin the cycle. The clamp sensors would be checked to assure that the squashed tubes are in both clamps and that the clamp lids 54 are closed as previously described.

The computer 146 operates the welder to test to see if there are two tubes properly loaded by trying to pull the clamp assemblies apart. If properly loaded this is possible to do, but if only a single tube is loaded or a tube spans both clamps it is not possible to pull the clamp assemblies apart.

If the proper conditions are all correct the heaters are then turned on. As the temperature increases thermocouples mounted in the heaters monitor the temperature of the wafer 16 to assure that the proper temperature is reached. When that temperature is reached the welding cycle begins. The heaters are turned off and the carriage drive motor 86 is turned on to cause the carriage 36 to draw the wafer 16 to the melt position. The motor 86 is then turned off and the arm motor 108 causes the tubes to touch the hot wafer for the first time. That time is noted and saved by the controller 146. The tubes 66 are driven into the sides of the wafer by the motor 108 at a controlled rate determined by the melt rheology.

The carriage motor 86 is again started to again move the carriage 36 and its wafer 16 rapidly to the weld position in the wafer removal station 111. At the same time the arm motor 108 will control the closure of the arms so that they do not attempt to form a weld until the wafer is completely clear of both tubes 66 at which point the tubes 66 will be driven together to a known final weld point. Both motors 86 and 108 then stop and the controller 146 begins monitoring the time to allow the weld to set and the spent wafer to cool. After cooling the tube clamps are opened and the welded tubes removed.

The welder 10 includes various indicators to assure that the proper conditions are present. For example, as previously noted LED 115 indicates that the wafer is in its proper position. LED 118 would indicate that the tubes are properly loaded. LED 117 would indicate that the welder is on when start button 116 is pushed. LED 120 would indicate that the welder 10 is in its connect mode when, for example, button 116 is pushed twice. LED 122 would indicate that the welder 10 is in its disconnect mode. LED 124 would indicate that the wafer has been heated to its proper temperature.

Figures 15, 21:
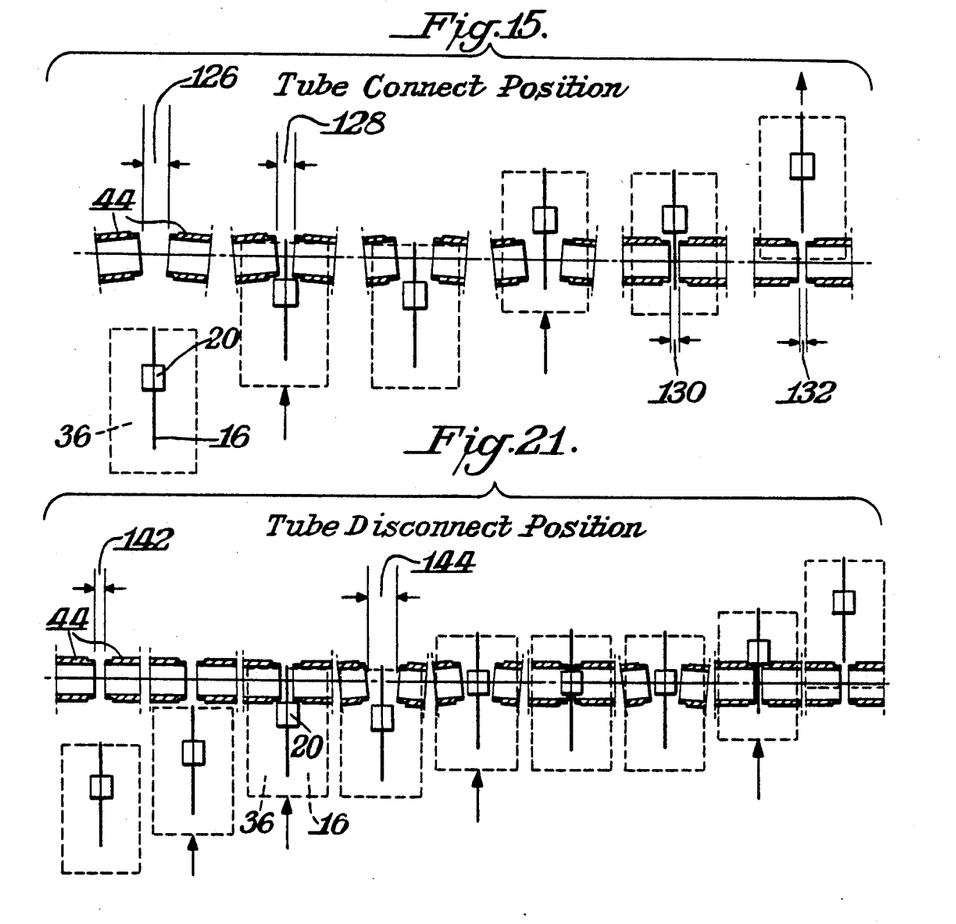
FIG. 15 is a schematic showing of the sequence of operation for the tube connect technique.
FIG. 21 is a schematic showing of the sequence of operation for the tube disconnect technique.

FIG. 15 schematically illustrates the sequence in operation in the tube connect procedure. As shown therein in the first phase of operation the wafer 16 is mounted to carriage 36 with carriage 36 being in its start position. Tubes are mounted in arms 44,44 apart from each other by the distance indicated by the reference numeral 126.

In the next phase of operation Carriage 36 moves wafer 16 into the gap between the ends of the tubes. The tubes are moved closer together by the distance indicated by the reference numeral 128. In this position the ends of tubes are under the influence of wafer 16.

Figure 16:
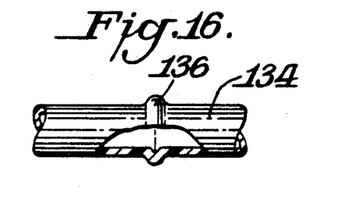
FIG. 16 is a side elevational view partly in section showing a tube resulting from the connect technique.
Figure 17:
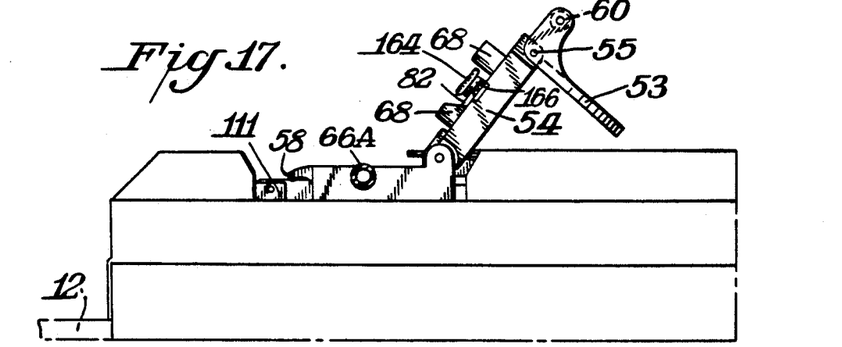
FIG. 17 is a side elevational view of the device shown in FIGS. 1-4 with a tube mounted for the disconnect technique.

In the next phase of operation the ends of the tubes are moved sufficiently apart to permit the wings 20 of the wafer 16 to pass between the tubes as shown in the third step of FIG. 15. The tube ends are then moved toward wafer 116 spaced apart by the distance 130 so that the ends of the tubes become molten. After wafer 16 has passed beyond the tubes, 66 the tubes are in a condition to be pressed together and form a unitary tube 134 as shown in FIG. 16 with the ends welded by seam 136. By squeezing at the weld seam with clamp pads 164 the tube ends of the joined tube 134 become open and communicate with each other.

The following describes the use of welder 10 in the disconnect procedure wherein reference might also be made to FIG. 21. Again the cycle begins at the home position with no tubes in the welder. A new wafer is installed as previously indicated. The user inserts a single tube 66A across both pockets 62 in so installing the tube, the tube 66A extends across the pockets and forces the locating walls 64 out of the pockets. Clamp lids 54 are then closed and locked.

Each press of button 116 conditions welder 10 to the next mode of operation. Thus, if the prior operation was the connect mode, the next press of button 116 puts welder in its disconnect mode.

The start button 116 is pressed and the control unit reads the signal to begin the cycle. LED 122 indicates that the welder 10 is in the disconnect mode. The clamp sensors would be checked to assure that the tube is squashed and the clamp covers are closed. The user could test to see that there is only one tube loaded by having controller 146 try to pull the clamped assemblies apart. If correctly loaded it is not possible to do this. Only if the loading is not proper can the clamp assembly be pulled apart. When the loading is proper the heaters are turned on and the temperature monitored as previously described. At the proper temperature the cycle begins. The heaters are turned off and the carriage motor drive 86 is turned on to cause the carriage 36 to draw the wafer to the cut position. The wafer 16 then melts its way through the tube 66A parting it into two sections.

Figure 22:
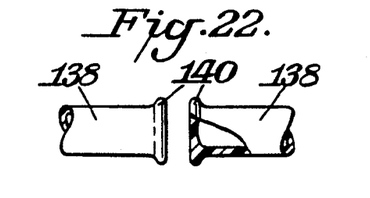
FIG. 22 is a side elevational view partly in section showing the tube sections resulting from the tube disconnect technique.
Figure 23:
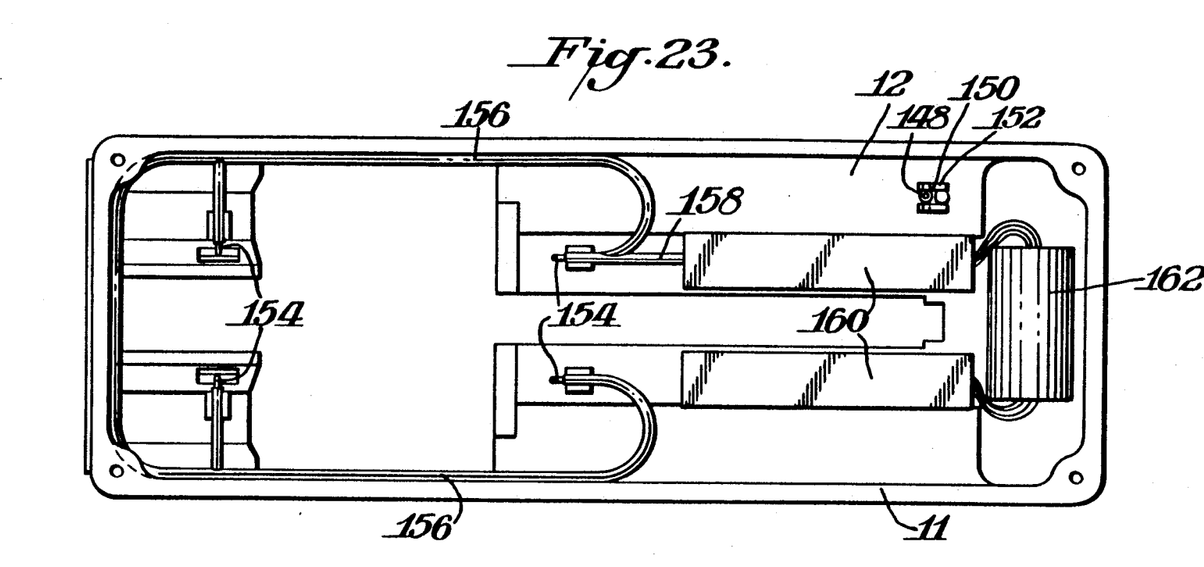
FIG. 23 is a bottom plan view of the upper shell of the casing of the device shown in FIGS. 1-4.

When the tubes are parted the arm motor 108 starts and causes the arms 44 to move apart to make room for the wings 20 of the wafer to get into position. Once the carriage motor 86 has moved a wafer into position it is turned off. At this point the arm motor 108 causes the tube sections to move together since the hot wafer 16 is between the exposed ends of the tubes, however, the wings 20 of the wafer 16 plunge into the ends of the flattened tubes. Since the wafer 16 is still at a very high temperature on the order of 300° C. the lumen of the exposed tube ends is fused to form a seal. At this point the clamp arms 44 are quickly drawn apart and the seals are allowed to cool. FIG. 22 illustrates the two tube sections 138 with the end seals 140.

The motor 86 is again started to move the carriage 36 and wafer 16 rapidly to the wafer removal station 114. The carriage motor 86 then stops and the controller begins motoring the time to allow the seal to set and the spent wafer 16 to cool. After cooling the tube clamps are opened and the sealed tubes removed. Spent wafer 16 is discarded and carriage 36 returns to its start location.

FIG. 21 illustrates the condition of the arms 44 which would hold the tube 66A and the position of the wafer 16 in carriage 36. In the initial stage of operation the ends of arms 44 are spaced apart by the distance 142. This distance is maintained while the wafer cuts through the tube 66A which spans arms 44,44. When the wings 20 approach the arms 44 the arms 44 are moved apart to the distance 144 to permit the wings to enter the gap between the cut tube ends. The arms are then moved toward each other so that the wings enter the molten ends of the tube sections. Again the arms are moved apart and the wings become free of the tube ends so that the wafer can move beyond the tube ends.

The above descriptions of the connect and disconnect procedures is fully automated by the use of controller or computer 146. This marks a distinct advancement over the present state of the art technology where manual operation of switches is necessary to perform connect and disconnect procedures. FIG. 29 illustrates a flow block diagram showing the operation of controller 146. Any suitable controller or computer can be used. In an actual practice of the invention a Micro Controller Intel 8050 Micro 440 is used for controller 146. As shown therein the analog signals are fed to and from the controller 146 to control the operation of welder 10. The use of magnetic encoders 87 and 107 in connection with the carriage motor 86 and arm motor 108 provides a means for determining exactly where the carriage and arms are at any given time. Each encoder would track the number of revolutions of the respective motor shaft which would be translated into a time and/or distance parameter for controller 146. Controller 146 would also function to determine if stub ends are in the clamp arms and if the clamp arms are in the proper spacing. For example, when the motor 108 is operated to move the arms to their closed position the arms could not be moved sufficiently close to each other if stub ends are inadvertently left in each arm since the stub ends would contact each other before the arms are moved to the closed position.

Figure 28:
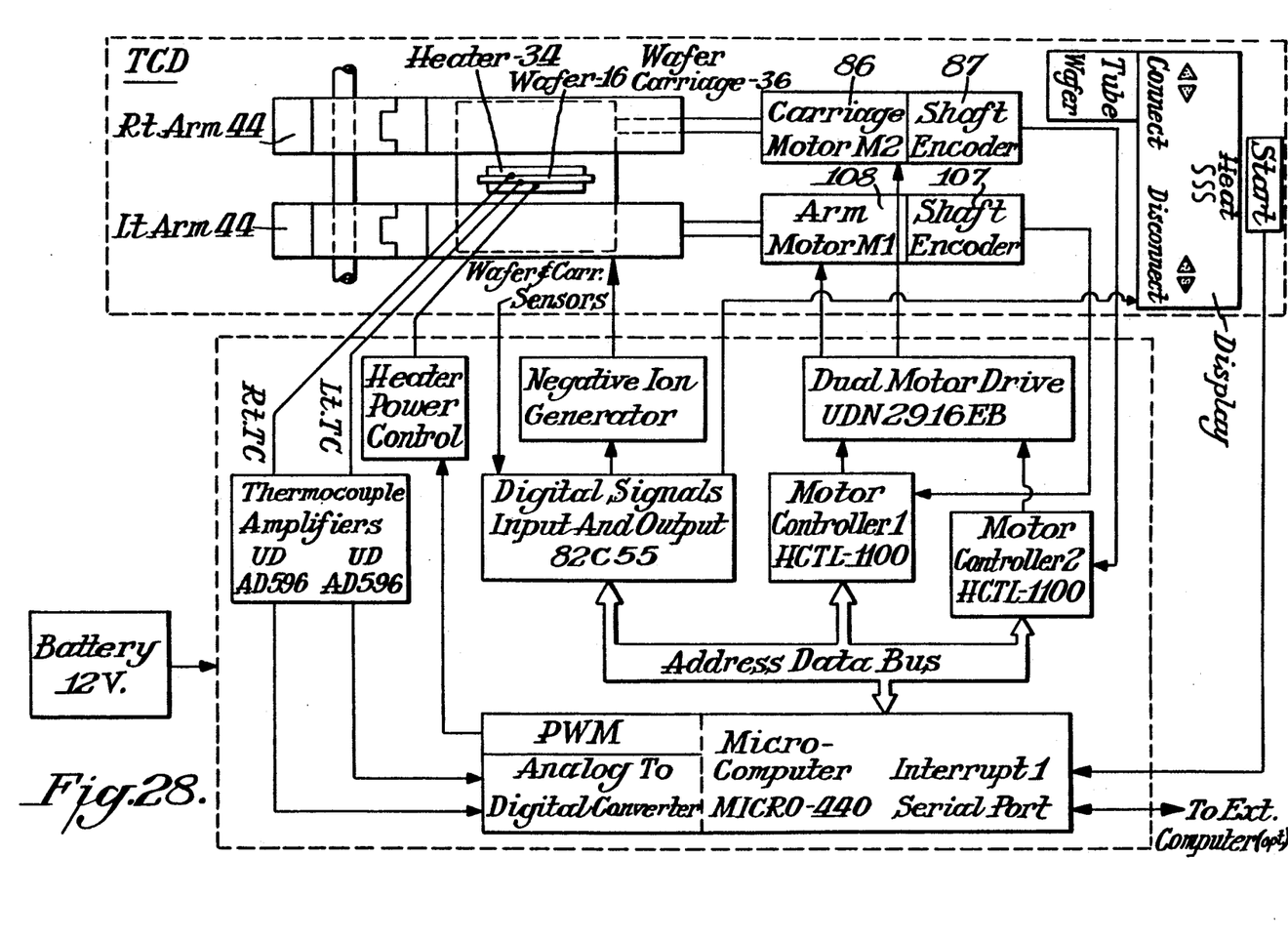
FIG. 28 is a block diagram of the controller used with the device of FIGS. 1-4.

FIG. 28 is a block diagram showing the interrelationship of controller 146 with the various components of welder 10, including the operation of the arms, the carriage and the wafer.

Figure 29A:
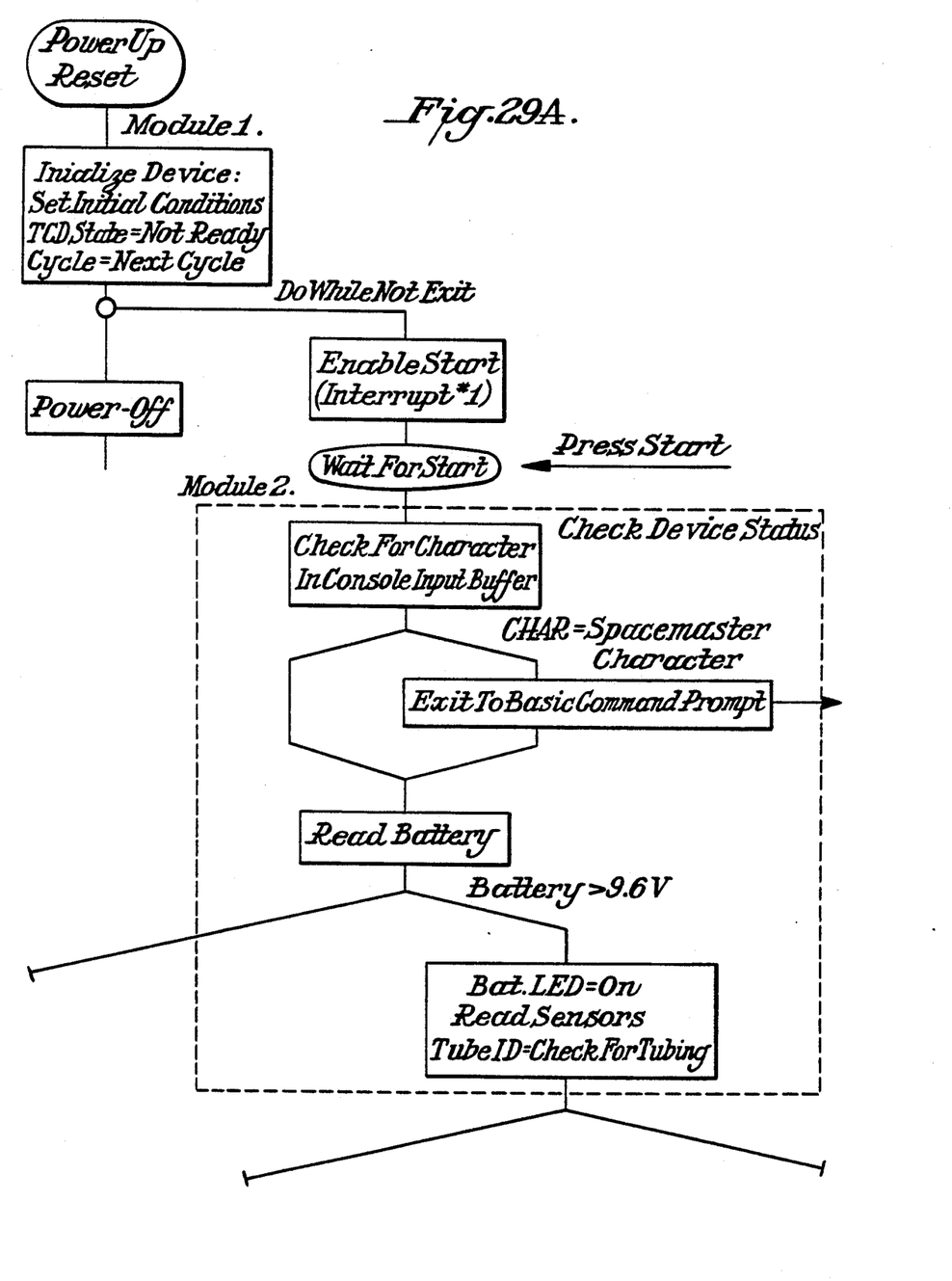
FIGS. 29A-29C are a flow diagram showing use of the controller of FIG. 28.
Figure 29B:
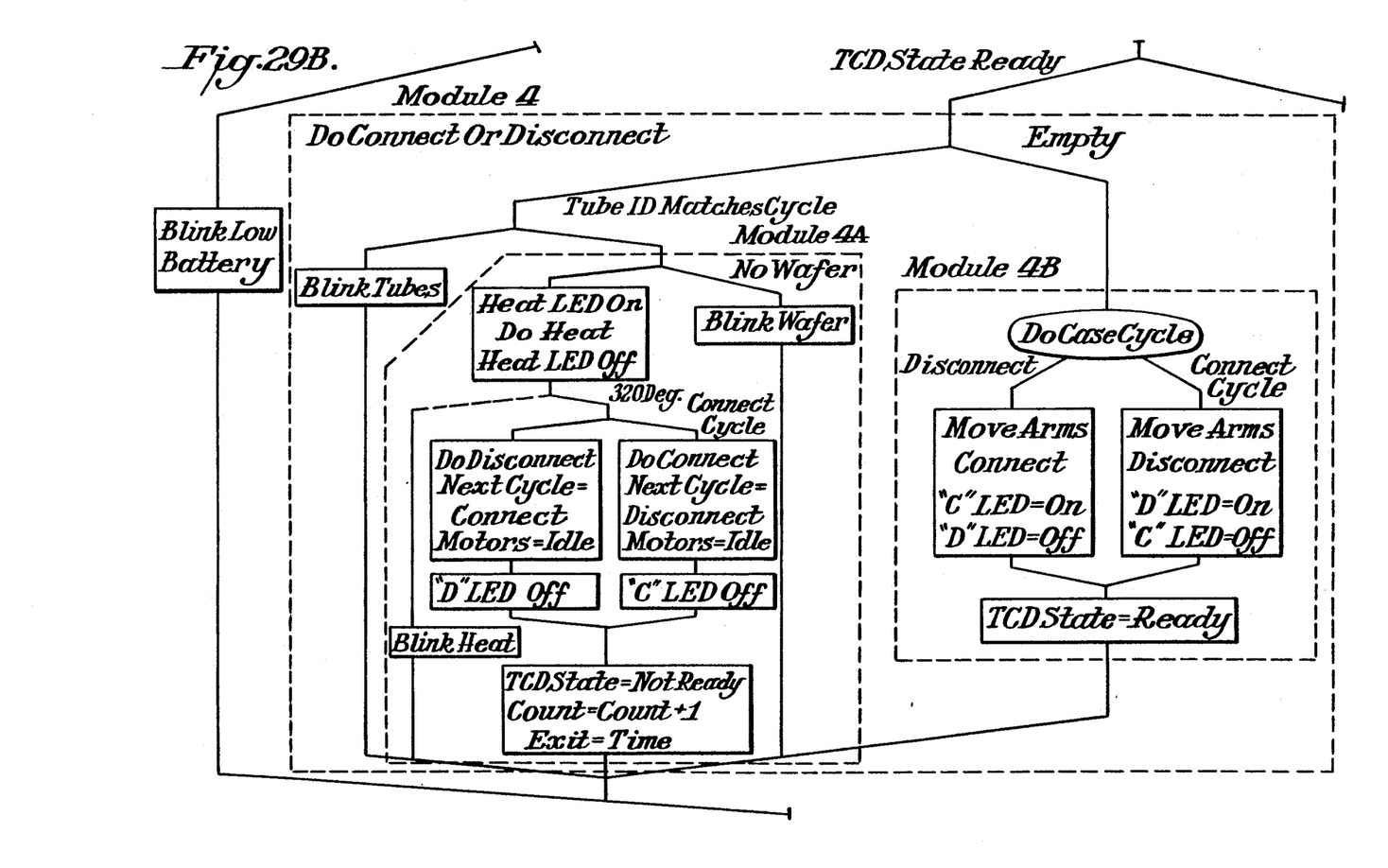
Figure 29C:
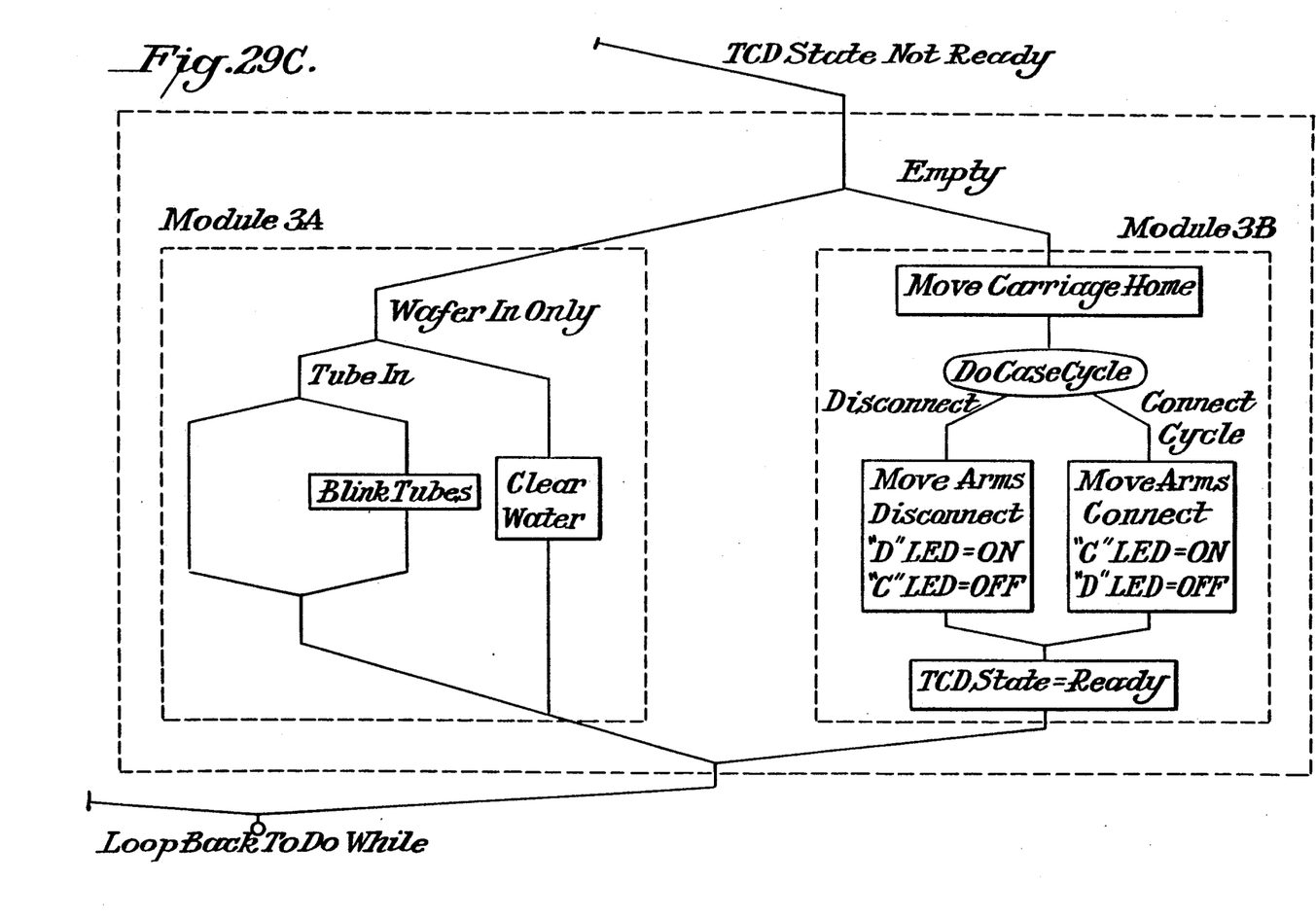

FIGS. 29A-C illustrate a software program which would exemplify the use of welder 10. In that program welder 10 is controlled by a computer program which consists of four main modules:
1. ACTIVATE DEVICE
2. CHECK DEVICE STATUS
3. GET DEVICE READY FOR TUBE LOADING
4. DO CONNECT OR DISCONNECT

MODULE 1

Activate Device

This sets initial conditions: such as clear interrupts, turn clock ON, make sure negative ion generator 154 is OFF and set welder state to NOT READY for tube loading. It also reads the Next CYCLE information that was saved in memory from the last successful cycle.

MODULE 2

Check Device Status

This program module handles the START push-button 116 event and checks the device status. Only one push-button switch (the START push-button 116) initiates CONNECT, DISCONNECT, CHECK-STATUS to COMMUNICATE with an optional external computer. This is rather unique because it eliminates four switches (power ON/OFF, connect, disconnect and start heat switch) and makes it simple to operate. Check-Device-Status program reads the sensors and identifies the type of tubing, if any, inserted in the device. If the arms 44 of the device 10 move from completely closed to completely open positions then the device 10 is empty (no tubing inserted). If the arms 44 can not move then tube type is set to be single, solid tubing. If the arms 44 move and stop at a preprogrammed valid position then the tube type is two tubes, ready for connect.

Module 2 also measures battery voltage and blinks the power indicator 117 if battery voltage is too low for proper operation.

MODULE 3

Get-Device Ready for Tube Loading

Initially, when power is applied, the unit is not ready for tube loading. First Module 3 blinks the TUBES indicator if tubing from previous operation was not removed. Second, Module 3 moves the wafer carriage 36 all the way forward to wafer unload position (CLEAR WAFER routine) if a used wafer 16 has been detected. (See Module 3A).

If the device is empty (no wafer and no tubes) then GET-DEVICE-READY routine moves the wafer carriage to home position. If CYCLE is set for connect then arms move to home position for connect and connect indicator turns ON. Otherwise, if CYCLE is set for disconnect, arms move to home position for disconnect and disconnect indicator turns ON. (See Module 3B).

MODULE 4

Do Connect or Disconnect

If a wafer 16 and proper type of tubing is detected when START 116 is pressed the program routine in Module 4 starts applying heat to the wafer 16. When wafer 16 reaches required temperature then the device makes a tubing connection or a disconnection. If current CYCLE is connect and two tubes are detected then proper arm and carriage movements are generated by module 4 to make a connection. Otherwise, if current CYCLE is disconnect and a solid, single tube is detected the device performs arm and carriage movements to severe and seal the tubing. Module 4 then sets and saves the Next Cycle in non-volatile memory. The program always alternates next cycle, that is, if current CYCLE is connect then Next Cycle will be set for disconnect or vice versa. Module 4 also counts the number of connects and disconnects made and also sets EXIT true, which means the main program will turn power OFF to conserve the battery power. Note: The START push-button turns power ON.

If the device is ready and is empty when START is pressed, that is, no wafer and no tube has been inserted, then program Module 4B will switch the current CYCLE. For example if current CYCLE is connect, CYCLE will be set to disconnect and arms will move to home position for disconnect.

What is claimed is:

1. A device for selectively connecting and disconnecting plastic tubes comprising a welder, a carriage in said welder for transporting a wafer in said welder, a pair of arms in said welder, each of said arms having a tube holding pocket extending across its said arm, said arms being movably mounted to generally align said pockets with a gap therebetween, each of said arms having a clamp mechanism for selectively clamping a tube in its pocket, a wafer removal station in said welder downstream from said arms, carriage drive means for moving said carriage to said wafer removal station with the wafer first passing through said gap and then into said wafer removal station to permit the wafer to be removed from said carriage and said carriage to return to its starting location, and a computer for controlling the operation of said arms and said carriage to automate the operation of said device.

2. The device of claim 1 including a heating assembly for heating the wafer so that the wafer may melt the tubes during the connecting mode of operation, and an aerosol control mechanism to control the aerosol produced by the melted plastic tubes.

3. The device of claim 2 wherein said wafer removal station includes quench blocks into which the wafer is disposed by the carriage after passing through said gap, and said quench blocks being part of said aerosol control mechanism.

4. The device of claim 3 wherein said aerosol control mechanism further includes negative ion generators located near said quench blocks to dissipate the aerosol and cause the dissipated aerosol to be attracted to the wafer.

5. The device of claim 4 including a cover mounted over said welder to create a cavity for confining the aerosol.

6. The device of claim 5 wherein said quench blocks are made of copper.

7. The device of claim 6 wherein each of said clamp mechanism includes a base clamp and a clamp lid movably mounted for selective movement toward and away from said base clamp, and a clamp pad on said clamp lid for pressing against a plastic tube.

8. The device of claim 7 wherein said clamp pad terminates in a serrated edge.

9. The device of claim 8 including sensing means for sensing the condition of said carriage and the wafer.

10. The device of claim 9 wherein said computer completely automates the sequence and timing of the operation of said arms and said carriage and of the wafer.

11. The device of claim 1 wherein said clamp mechanism includes a base clamp and a clamp lid movably mounted for selective movement toward and away from said base clamp, and a clamp pad on said clamp lid for pressing against a plastic tube.

12. The device of claim 11 wherein said clamp pad terminates in a serrated edge.

13. In a method for selectively connecting and disconnecting plastic tubes wherein during the connecting of the plastic tubes the ends of the tubes are clamped to a flattened condition by clamp mechanisms and the ends of the tubes are melted by a heated wafer and the ends of the melted tubes are pressed together by manipulation of arms holding the clamp mechanisms to weld the tubes together at a seam, and wherein during the disconnecting mode a plastic tube is inserted across clamp arms and cut into individual sections by a heated wafer and the ends of the cut tubes are sealed closed, the improvement being in that the connecting and disconnecting modes are performed in the same welder device, the wafer being moved through the welder device by a carriage, and the operation of the arms and the carriage being automated by a computer.

14. The method of claim 13 including flattening the during the connect mode by means of clamp pads incorporated in the clamp mechanisms, after the flattened tube ends are connected together removing the clamp pads, away from the connected tube, then rotating the connected tube about 900° while the connected tube is in the clamp mechanisms, and then opening communication of the connected tubes by pressing against the tubes with at least one of the clamp pads.

15. The method of claim 14 including the step of preventing slippage of the rotated tube by means of a serrated edge on the clamp pad.

16. In a method for connecting plastic tubes wherein the ends of the tubes are clamped to a flattened condition by clamp mechanisms whereby the tubes have a thick dimension and a thin dimension when flattened, the ends of the tubes are melted by a heated wafer, and the ends of the melted tubes are pressed together by manipulation of the arms holding the clamp mechanisms to weld the tubes together at the seam, the improvement being in flattening the tubes by means of clamp pads incorporated in the clamp mechanisms wherein the thick dimension is disposed against the clamp mechanisms, after the flattened tube ends are connected together removing the clamp pads away from the resulting connected tube, then rotating the connected tube about 90° while the connected tube is in the clamp mechanisms with the thin dimension disposed against the clamp mechanisms, preventing slippage of the rotated tube by means of a serrated edge on the clamp pad to maintain the flattened tube in its rotated position, and then opening communication of the connected tubes by pressing against the connected tube with at least one of the clampp pads while the tube is in its rotated position.

* * * * *